United States Patent [19]
Monbaron et al.

[11] Patent Number: 4,509,133
[45] Date of Patent: Apr. 2, 1985

[54] APPARATUS FOR INTRODUCING CONTROL WORDS BY SPEECH

[75] Inventors: Jean-Jacques Monbaron, Malvilliers; Ngoc C. Bui, Neuchatel, both of Switzerland

[73] Assignee: Asulab S.A., Bienne, Switzerland

[21] Appl. No.: 374,019

[22] Filed: May 3, 1982

[30] Foreign Application Priority Data

May 15, 1981 [CH] Switzerland .................. 3179/81

[51] Int. Cl.$^3$ .............................................. G10L 1/00
[52] U.S. Cl. .................................... 364/513.5; 381/43
[58] Field of Search ............... 364/513, 513.5; 381/43, 381/42

[56] References Cited

U.S. PATENT DOCUMENTS 3,812,291 5/1974 Brodes et al. .................. 381/43
4,394,539 7/1983 Warren et al. .................. 381/43

OTHER PUBLICATIONS

An Adaptive Speech Recognition System Operating in a Remote Time-Shared Computer Environment, IEEE Transactions on Audio & Electroacoustics, vol. 18, No. 1, Mar. 1970, pp. 26–31.
A Real Time Spoken Word Recognition System in a Large Vocabulary with Learning Capability of Speaker Differences, Proceedings of the Fourth Intl. Joint Conference on Pattern Recognition, Nov. 1978, p. 985.
Spoken Word Recognizer, IBM Technical Disclosure Bulletin, vol. 13, No. 7, Dec. 1970, pp. 1944–1945.

Primary Examiner—E. S. Matt Kemeny
Attorney, Agent, or Firm—Spensley, Horn, Jubas & Lubitz

[57] ABSTRACT

Speech recognition is improved by adaptive update of reference word codes. The apparatus can be used for controlling a piece of equipment and comprises memories which in coded form contains the references of the vocabulary of the machine; a microphone, a coding circuit and a memory for coding and memorizing the word pronounced by the user; a device for displaying the word recognized by the apparatus; and a control circuit for comparing the pronounced word to the different memorized references and for displaying at each repetition of the word the words corresponding to the references in their order of resemblance to the pronounced word. The user is able to train the apparatus easily by repeating a word until the displayed word agrees with what he has said, the coded form of this spoken word then being stored as the reference for the corresponding word of the vocabulary.

6 Claims, 9 Drawing Figures

| WORD PRONOUNCED | WORD DISPLAYED |
|---|---|
| 1 WATCH | ALARM |
| 2 WATCH | HOME TIME |
| 3 WATCH | WATCH |

| WORD PRONOUNCED | WORD DISPLAYED |
|---|---|
| 1 WATCH | ALARM |
| 2 CHRONO | HOME TIME |
| 3 CHRONO | CHRONO |

APPARATUS FOR INTRODUCING CONTROL WORDS BY SPEECH

BACKGROUND OF THE INVENTION

The present invention relates to an apparatus for introducing control words by speech and concerns an apparatus in which the training operation is performed by the user himself as he uses the piece of equipment associated with the word introduction apparatus. The expressions "words" and "training" will be explained below.

Bearing in mind the greater ease of use which is achieved as a result, is is increasingly envisaged that some pieces of equipment may be controlled directly by speech. It will be appreciated that such an apparatus must comprise at its input a means for introducing words, which will actually serve to control the piece of equipment. Irrespective of the type of equipment to be controlled, it must have for control purposes a vocabulary which essentially comprises instructions and data. Instructions are most frequently in the form of words or groups of a limited number of words, while the data are in the form of figures or numbers. In this specification, the expression "word" will be used to cover the whole of the instructions and data to be introduced into the machine. A "word" will therefore cover, on the one hand, single words and, on the other hand, multiple instructions and data (including numbers and groups of a few words).

Speech-controlled equipment all operates using substantially the same general procedure. The equipment comprises memories for recording information representing in decoded form the different words of the vocabulary which are required to control the equipment and which will be referred to hereinafter as references. When the user actually wishes to control the piece of equipment, he pronounces a word from that vocabulary. The input apparatus converts that word into an electrical signal which in turn is coded using the same coding as that which was used to introduce the memorized information forming the vocabulary of the equipment. The word introduction apparatus compares the coded word to the different references contained in its memory and selects the memorized reference which is closest to the word which has been pronounced. It is the word associated with that reference which will be used to control the apparatus.

The phase which involves introducing into the memory the references corresponding to the whole of the words forming the vocabulary of the equipment will be referred to as training. It will be clear that the quality of the training is a decisive factor in regard to the quality and reliability of controlling the equipment by means of speech.

Two types of training are generally envisaged. In the first type, which can be referred to as a pre-programmed training, the references are initially introduced in the factory by a model or standard speaker. Such references may also comprise model of standard references which are defined by statistical analysis of the different ways of pronouncing a word. The pieces of information corresponding to the different words of the vocabulary are therefore memorized once and for all and definitively. This type of training has the advantage that the user of the equipment can immediately make use thereof, without his having to carry out the training operation for the equipment. However, the major disadvantage of such a training process is that the memorized vocabulary words have been pronounced by a model of a standard speaker whereas the word introduced into the machine for controlling it are pronounced by the user. It is extremely likely the the same word will be pronounced differently by the standard speaker and by the user. In order for the equipment to operate satisfactorily, that is to say, so that the word pronounced by the user is actually recognized by the equipment, it is necessary to provide fairly complicated word coding and a very highly developed comparison algorithm in order to overcome the problems involved in the differences in pronounciation of the same word. Using the highly elaborate comparison algorithm and a very precise coding process gives rise to substantial complication in the coding and memory circuits, that is to say, that increases the costs of such circuits and the area of silicon required to form such circuit. Now, in some uses, it is not possible to allow for a high level of cost for production of the word introduction device, or to use a substantial amount of space in the overall apparatus for incorporating the introduction circuit.

The other type of training may be referred to as initial training. On leaving the factory, the word introduction apparatus does not have any stored information regarding the words of the vocabulary of the piece of equipment. The training operation is initially performed by the user of the apparatus himself. This training process permits good quality of identification as between the reference words and the word pronounced, since it is the user himself who introduced the reference words. The major disadvantage of this training process is that the user must himself introduce the reference vocabulary into the equipment and that the quality of this phase governs the subsequent quality of operation of the equipment. In addition, this training phase, which is the first encounter of the user has contact with the equipment has a discouraging and disheartening effect on the user. That factor makes it more difficult to commercialize an apparatus using such a method of training. In addition, this training procedure suffers from two limitations. Firstly it is truly effective only if the equipment has only one user. On the other hand, it is easy to find that the same speaker will pronounce the same word in different ways at different times, for various reasons. This means that there is the danger of losing the advantage of the user himself carrying out the training.

It is possible to envisage controlling a variety of items of equipment directly by speech, by means of a given vocabulary. Control of this type may be used in particular, by way of example, for a multi-function watch. Such a watch may give the local time (hour-minute-second-date-day of the week). It may give the time in different time zones; it may have several alarm times; is may also have a stop-watch function, etc. Usually, the operation of selecting one of these functions is effected in electronic watches by means of stems or push-buttons. Those members serve both to select a function and also to introduce data relating to such functions, for example to correct the time, to select the time zone, to display an alarm time, etc. When the watch has a large number of functions and when in addition the number of control members is to be limited, the method of using the different control members becomes increasingly complicated to remember, particularly for controlling functions which are infrequently used. This complexity may also cause unfortunate errors. It is easy to see that control by means of speech makes it possible to eliminate or very substantially reduce the number of control members and to use a control procedure which is much closer to the natural procedure, which involves saying what is to be done.

As already indicated above, the apparatus which is the subject of the present invention is applied particularly to multi-function electronic watches, preferably of the digital display type. It will be appreciated however that the apparatus could also be used for controlling other equipment.

SUMMARY OF THE INVENTION

In order to remedy the above-mentioned disadvantages, a first object of the invention is to provide an apparatus for introducing control words using speech, which combines the advantages of pre-programmed training with those of an initial training by the speaker, without suffering from the disadvantages of those two processes.

A second object of the invention is to provide such an apparatus which can be easily used for controlling a digital display electronic watch, that is to say, which does not use a substantial area of components and which does not consume a substantial amount of electrical energy.

A third object of the invention is to provide such an apparatus, which gives a good quality of indentification as between the word pronounced and the memorized words of the vocabulary.

A fourth object of the invention is to provide such an apparatus, which can be easily used by several speakers, without introducing major handling limitations and conditions.

According to the present invention, there is provided apparatus for introducing control words by speech, wherein a word pronounced by a speaker is coded and compared to memorized items of information each corresponding to the coding of one word of a vocabulary of n words previously introduced into the apparatus, comprising means for coding each word pronounced by the speaker in accordance with a first predetermined algorithm, which gives a coded word; means for memorizing n references each corresponding to the coding of one of the n words in accordance with said first algorithm and at least one word pronounced by the said speaker in coded form; means for displaying one of said n words; means for controlling a change of references; and a control circuit connected to the memorizing means and to the display means, comprising: (a) repetition detection means for comparing a coded word to the coded pronounced word previously, if it exists, in dependence on a second predetermined algorithm, to detect whether or not repetition takes place; (b) means responsive to the detection means for comparing a coded pronounced word when there is no repetition, to the n references, and to allocate to each reference a level of resemblance with the coded pronounced word in dependence on a third predetermined algorithm; (c) means for controlling the display of the memorized reference having the first level of resemblance when no repetition has been detected, and for controlling, if repetition has been detected, the display of the word associated with the reference occupying the level of resemblance which immediately follows that of the reference associated with the word displayed immediately previously; and (d) means for replacing in the memory the reference associated with the word displayed last by the information corresponding to the coding of the word repeated in response to activation by the speaker of the means for controlling a change of reference, when the speaker has found that the word displayed is the word that he actually pronounced, which gives a fresh reference for the said word.

The apparatus makes possible a training process which is referred to as "adaptive".

It will be seen from the foregoing definition of the invention that as in the case of pre-programmed training, the apparatus comprises in its memories the references corresponding to the n words of the vocabulary of the piece of equipment to be controlled, such references for example having been recorded in the factory by a model of a standard speaker. When the user first makes use of the apparatus, he pronounces a word corresponding to an instruction that he wishes to give to the machine. If, after the speaker has pronounced that word, the display means actually displays that word, that proves that the standard speaker and the user have the same way of pronouncing that word, and there is no need for a training phase. If on the other hand, after having pronounced a word, the user finds that the word displayed is different, he will have to repeat that word until the display means actually displays the word he pronounced. At that moment, the coded information corresponding to the word repeated by the user is substituted for the coded reference which was initially introduced by the standard speaker.

Training has therefore taken place, in relation to that word. It is important however to note that the number of repetitions required for this training operation is optimized by virtue of the initial classification on the basis of order of resemblance between the word pronounced and the references.

Moreover, it is clear that, as in the case of the initial training process, there is no training phase and then a phase involving normal use of the word introduction apparatus. The training operation is carried out on a permanent basis. It takes place without any particular procedure being involved, as soon as the user finds that the word displayed does not correspond to the word he pronounced.

The intention also concerns developments of the apparatus as defined hereinbefore, which make it possible, on the one hand, to avoid operating errors made by the user of the apparatus and, on the other hand, to optimize the mode of operation of the apparatus according to the invention.

BRIEF DESCRIPTION OF THE DRAWINGS

Other features and advantages of the invention will be described in more detail, by way of example, with reference to the accompanying drawings, in which.

DETAILED DESCRIPTION OF THE PREFERRED EMBODIMENT

Figures 1, 2A, 2B:
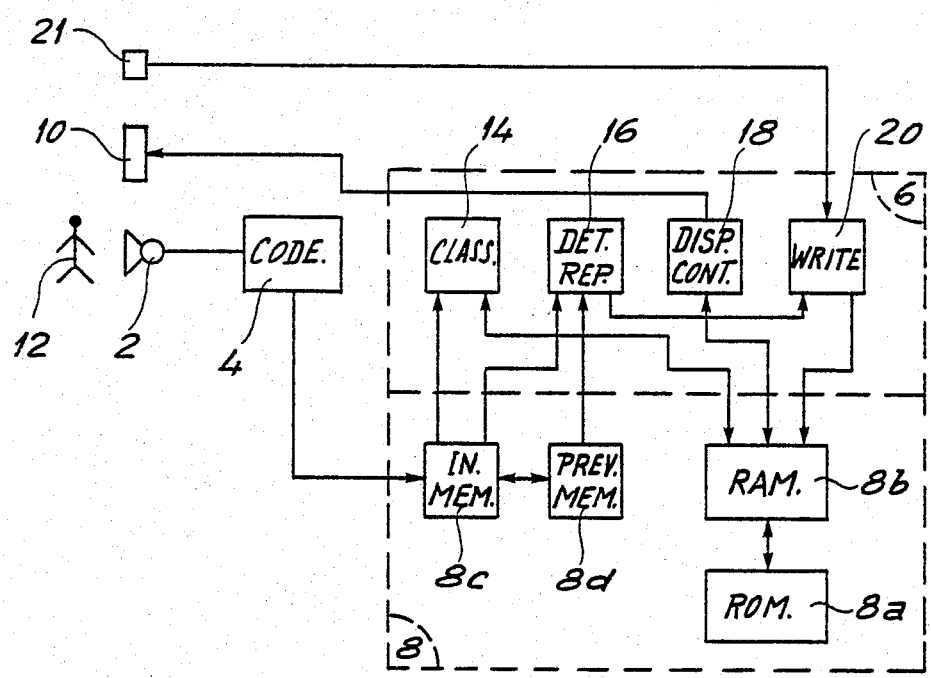
FIG. 1 is a simplified block diagram of one apparatus embodying the invention.
FIGS. 2a and 2b are tables illustrating two possible training procedures.

FIG. 1 is a simplified block diagram of the word introduction apparatus in accordance with the invention. This apparatus comprises a transducer 2 which converts vocal information into an electrical signal and which is preferably a microphone. The electrical signal supplied by the microphone 2 is coded by a circuit 4 which at its output produces digital information, preferably in binary form. The operation of coding an electrical signal representing speech in the form of binary digital information is a known problem. There are many coding processes and apparatuses for carrying such processes into effect. The invention can be employed irrespective of the coding process and apparatus used. It will be appreciated that the information which is to be introduced into the apparatus and the initially memorized coded information, that is to say, the references, are coded by means of the same procedure. The apparatus also comprises a control circuit generally indicated by reference numeral 6. This circuit will be described hereinafter. The word introduction apparatus further comprises memory means 8 in which the references are initially memorized, preferably in binary form, such references corresponding to the coding of n words forming the vocabulary required for controlling the piece of equipment associated with the word introduction apparatus.

Finally, the apparatus includes a display means 10 for displaying one of the n words of the vocabulary. When the piece of equipment associated with the word introduction apparatus is a watch, the display means 10 is formed by the whole of the face of the watch. This means that the display means may be formed, on the one hand, by a liquid crystal cell for displaying digital information representing for example the hour, minute, second, etc. and, on the other hand, by information printed on the face and associated with luminous display points. In other words, when considering the display of a word on the apparatus, this may involve the actual display of a number or alternatively the excitation of a luminous point disposed opposite an item written on the written face of the watch. These written items may, for example, form symbols representing the different functions to be performed by the watch. It is clear that the concept of a display means is to be interpreted in a very broad sense. In the data introduction apparatus, the display means 10 must permit the user of the equipment, as shown symbolically at reference numeral 12, to have return of the word actually recognized by the introduction apparatus. Consequently, instead of the display means 10 being the face of a digital display watch, it could be the dial of an analog display watch in which the position of the hands would be controlled to take account of the information actually introduced. For other uses, this could also involve a display screen on which the word introduced would actually be written. This could also be a printing means on which a user could check the information actually displayed.

The display means 10 could also be a sound means capable of emitting as many sound signals as there are words. This means may be a synthesizer of human speech which "says", the word recognized by the word introduction apparatus. It may also be a sound generator which produced as many separate sounds as there are words.

In other words, the purpose of the means 10 is simply to indicate the word recognized, to form an interactive monitoring element for the user 12, in respect of the information introduced into the apparatus. It may also be said that the means 10 is an element for reporting or indicating the word recognized in visual or acoustic form.

It should also be appreciated that the aim of the display means is simply to establish an unequivocal relationship between the word recognized and the indicated word. For example, if the "words" are printed in a first language on the display means with a luminous point facing each word to identify the word recognized, it is perfectly possible, by means of the apparatus according to the invention, to introduce corresponding words in a second language. It will be appreciated that for monitoring purposes, the user will have to make his own association as between the words printed in the first language, and the words introduced in the second language.

The memory menas 8 may be split up into a read only memory 8a which actually stores the coded references representing the words of the vocabulary which are stored in the memory in the factory; a random access memory 8b into which the references relating to the vocabulary words can be introduced; a memory 8c for storing the word which has just been pronounced and which has been coded by the circuit 4; and a memory 8d for storing the previously pronounced word. It will be appreciated that the memories 8c and 8d are in fact particular memory locations in the random access memory 8b.

The control circuit 6 first comprises a circuit 14 for classifying the n references contained in the memory 8b in dependence on their resemblance to the word pronounced by the user 12 in the microphone 2, coded by the circuit 4 and contained in the memory 8c. This classification is produced by applying an algorithm which makes it possible to measure the distance between the coded information associated with the word pronounced, and the coded references stored in the memory 8 corresponding to the n words of the vocabulary. A large number of algorithms can be envisaged. One of these algorithms will be described hereinafter by way of example. The control circuit 6 also comprises means 16 for detecting any repetition that may occur between two successive words pronounced by the user 12. The circuit 16 produces two signals, depending on whether or not repetition has been detected. Detection of a repetition involves using a second algorithm for comparison of two successively pronounced words. Many algorithms may be used and a possible algorithm will be described hereinafter. The circuit 16 therefore compares the information contained in the memory 8c to the information contained in the memory 8d if there is one. The control circuit 6 also comprises means 18 for controlling the display means 10. The circuit 18 which is connected to the memory 8b permits display at the display means 10 of that one of the n words memorized in the memory 8, which occupies the first level of resemblance to the word pronounced if no repetition has been detected by the circuit 16 and the word at the level of resemblance which immediately follows the word previously displayed, when repetition has been detected by the circuit 16. Finally, the control circuit 6 comprises a means 20 for modifying the references contained in the memories 8b and 8a. The circuit 20 substitutes, for a given memory location, for the information contained in that memory location and associated with the word which is actually repeated, that information therefore being displayed on the display means 10, the coded information correspoding to the word pronounced by the user 12, which is contained in the memory 8d. This substitution operation is controlled by the user 12, by means diagrammatically indicated by reference numeral 21. Such means may comprise a push-button. As will be described hereinafter, the substitution control means may also comprise timer means. If a certain period of time elapses after a word has been pronounced without a word again being pronounced, the control circuit 6 interprets that period of silence as agreement on the part of the user with the word which has just been displayed. It will be appreciated that in this case there is actually a training in regard to that word since there is an alteration in the memorized information associated with the word.

Figure 2:
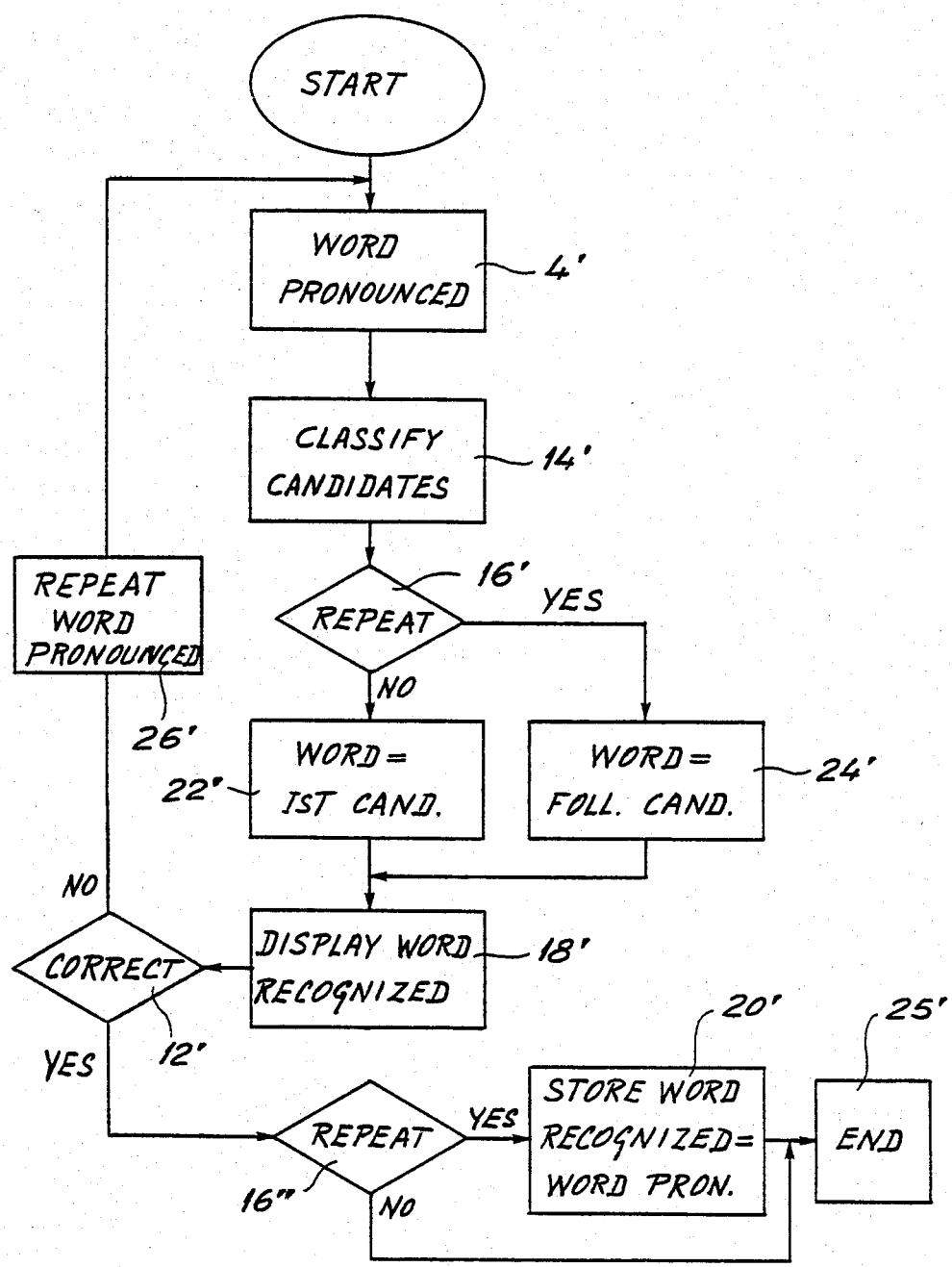
FIG. 2 is a diagram illustrating the mode of operation of this simplified embodiment.

FIG. 2 illustrates the mode of operation of the apparatus shown in FIG. 1. At the beginning of a cycle, the information contained in the read only memory 8a is transferred into the random access memory 8b, is processed to establish a classification in regard to the level of resemblance of the references to the word contained in the memory 8c. This operation is denoted by reference numeral 14'. In the description hereinafter, the different classified references relating to the n words memorized will be referred to as candidates, the first candidate being the reference which is closest to the word pronounced, the second candidate being the reference which follows it immediately in the order of resemblance, etc. Step 16' then involves detecting whether the word which has just been pronounced is a repetition of the previously pronounced word, by comparison between the information contained in the memory 8c and the information, if any, contained in the memory 8d.

If no repetition has taken place, it is considered that the word recognized is the first candidate, as defined above. This operation is denoted by reference numeral 22'. If in contrast repetition has occurred, the word recognized is identified with the candidate which follows the candidate which was displayed in relation to the previously pronounced word. This operation is indicated by reference numeral 24'. Irrespective of the preceding operation, the word recognized is displayed in operation 18', that is to say the system always reacts to the introduction of a word. In other words, even if the word pronounced is very different from all of the references contained in the memory, the display means will display a word, being that whose reference is closest to the word pronounced. There is no rejection threshold in regard to definition of the candidates. If the word recognized conforms with the word actually pronounced, which is determined by the decision 12' which obviously diagrammatically represents a response by the user 12, and if moreover no repetition has occurred (which is detected in the operation 16''), the operating cycle is terminated (block 25'). If the word displayed is correct but repetition has been detected at 16'', the information in the RAM 8b relating to the word recognized is replaced in operation 20' by the information relating to the word actually pronounced when the user controls it by the means 21, and the cycle is also terminated. If, on the other hand, it is detected at 12' that the word recognized, which is displayed, is not the word pronounced, the user 12 repeats the same word, which is diagrammatically indicated by reference numeral 26'. The repeated word is re-introduced into the operating procedure and replaces the pronounced word 4'.

It will thus be clearly seen that, in a first situation, the first time that a word is pronounced, the same word is displayed on the display means 10. In that case, there is no need for a training operation and the instruction corresponding to that word can be directly applied to the piece of equipment which is provided with the introduction apparatus. In plain terms, that means that the pronounciation of that word by the standard or model speaker and the pronounciation of the same word by the user are very similar.

In the second situation, the first time that a word is pronounced, the word displayed differs from the word pronounced. The speaker 12 repeats that word. When the word is repeated, the repetition is detected at 16' and the word displayed will therefore be the second candidate in the order of resemblance. If the second candidate is actually the word pronounced, the apparatus substitutes, at 20' in the memory 8b, information corresponding to the word actually replaced, for the reference initially contained in the memory. If, when this first repetition is made, the displayed word is different from the pronounced word, the speaker 12 repeats the word a second time, which will cause the third candidate in order to resemblance to be displayed. The procedure is repeated until the word displayed, that is to say, the word recognized, is identical to the word pronounced, in which case the reference initially contained in the memory is replaced by the coded information corresponding to the word pronounced. It will be seen therefore that the training function occurs only when necessary and in addition the training procedure is optimized, that is to say, the number of repetitions required is minimized, by virtue of the candidates being classified on the basis of their level of resemblance.

FIG. 2a illustrates a first training example.

In this example the vocabulary comprises at least the words WATCH, ALARM, HOME TIME, CRONO and TIMER. The speaker pronounces the word WATCH at first time. The first word displayed is ALARM. This difference is obviously because the references were previously introduced by another speaker. The speaker repeats the word WATCH and the second candidate in the order of resemblance to the word WATCH is HOME TIME which is therefore displayed by the display means 10. The speaker again repeats the word WATCH and the display means actually display the word WATCH. The circuit 20 then sustitutes the coded word WATCH pronounced by the speaker for the initially introduced reference corresponding to the word WATCH.

FIG. 2b corresponds to a second example. The speaker pronounces the word WATCH a first time. The display means displays ALARM. The speaker would therefore have to repeat the word WATCH. Inadvertently, he pronounces the word CHRONO. The circuit 16 detects that repetition has not occurred and the circuit 14 then defines another classification of candidates. The first candidate is the word HOME TIME which is therefore displayed. The speaker, noticing that an error has occurred, repeats CHRONO and CHRONO is the second candidate in the example under consideration. It is therefore displayed by the display means 10 and the circuit 20 substitues the coding of the word CHRONO as repeated by the speaker, in the memory 8b and 8a, for the reference CHRONO which was initially put into the memory.

Figure 3:
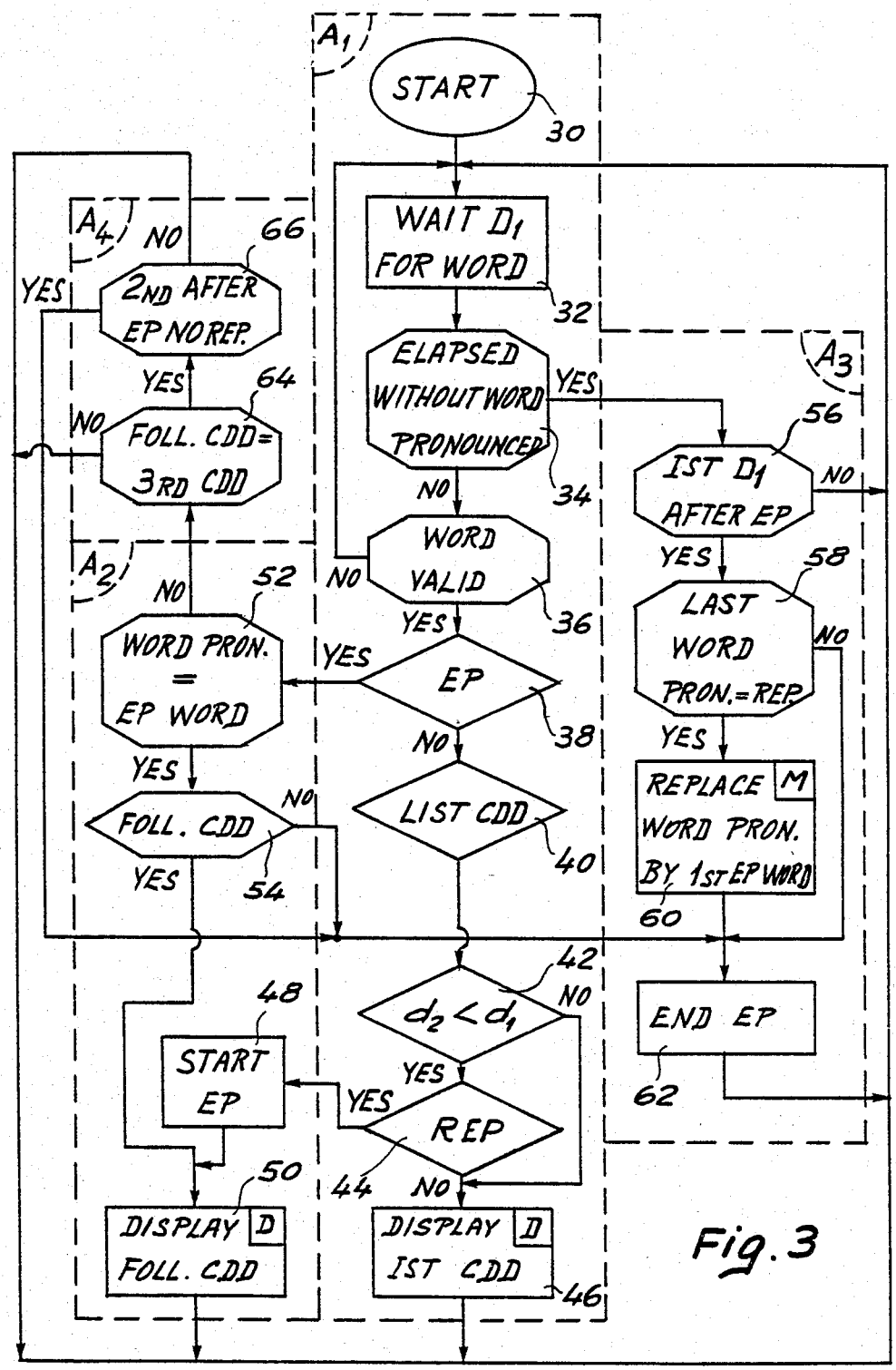
FIG. 3 is a complete algorithm in simplified form illustrating the mode of operation of the apparatus according to the invention.

FIG. 3 describes in greater detail the mode of operation of an improved embodiment of the word introduction apparatus according to the invention. In particular, in this embodiment, the apparatus takes account of errors in procedure which may be committed by the speaker in the initial phase, that is to say, when he is making use of the apparatus for the first time. It will be seen in particular from the foregoing description that the equipment uses a certain number of means for comparison between a coded pronounced word and memorized coded words. That occurs for example, when a possible repetition is to be detected or when the list of candidates is to be drawn up. Irrespective of the degree of accuracy of the algorithm used, it is clear that errors may occur, which would give rise to the danger of interfering with proper operation of the apparatus.

Operation of the apparatus may be split up into four parts: a routine A1 which corresponds to normal operation, that is to say, the word pronounced by the speaker is actually recognized and displayed immediately by the display means; a routine A2 corresponding to an error procedure, which is introduced when the displayed word is different from the word pronounced by the speaker; a routine A3 corresponding to the adaptive operation in the true sense, that phase occuring when the word displayed is made identical to the word pronounced after at least one repetition, and the aim thereof being to replace the initial reference by the fresh information in the memories 8a and 8b; finally, a routine A4 which permits detection of any errors which may have been committed by the speaker when an error procedure is initiated.

The coded word pronounced by the speaker is introduced at 30. 32 denotes the production of a waiting time delay d1 of one word. At 34, a check is made as to whether the time lapse between two successively pronounced words is or is not less than the period d1. If the time lapse is more than d1, the operation goes to the adaptive training routine A3. If on the other hand, the time lapse is less than d1, the operation goes to stage 36 for checking whether the coded word pronounced is valid. The purpose of this stage is to eliminate straightway the input of information which would not actually correspond to words, for example parasitic noise, etc. This stage 36 will be described in greater detail hereinafter. If the word pronounced is not valid, operation goes to stage 38 for detecting if an error procedure (EP) is being performed. If the response is positive, operation goes to the routine A2 corresponding to the error procedure. If the response is negative, operation goes to the stage 40 in which the list of candidates (CDD) is drawn up, that is to say, the list on the basis of decreasing level of resemblance to the word pronounced, of the different references contained in the memory corresponding to the words required for controlling the equipment. Stage 42 is then performed, to check whether the time d2 elapsed between the present word and the previous word is less than the period of time d1. If the response is positive, operation goes to stage 44 for detecting if the word pronounced is a repetition (REP) of the previously pronounced word. A comparison algorithm which will be described in detail hereinafter is used for that purpose. If repetition has occurred, operation goes to routine A2. If no repetition has taken place, operation goes to stage 46 in which the first candidate (1st CDD) is displayed, that is to say, the display means display the word which in stage 40 was detected as being associated with the reference closest to the pronounced word. This is the normal procedure, and the procedure which is used after the initial training phase. It should be noted that if at stage 42 the time lapse between the previous word and the word pronounced is greater than d1, the first candidate is displayed directly at 46, because it is then certain that no repetition has occurred.

The routine A2 corresponding to the error procedure will now be described. As already indicated, the error procedure A2 may be entered at two levels: either at the level of the stage 38 or at the level of the stage 44. The error procedure A2 is entered at level 44 if it has been detected that the word which has just been pronounced is a repetition of the previously pronounced word. In that case, an error procedure is triggered at 48 and the following candidate is displayed at 50, that is to say, in the case of initiation of the error procedure, the second candidate. It will be appreciated that in that case, if the second displayed candidate is the word actually pronounced by the speaker, operation goes to the adaptive training stage A3. It is also possible to enter the error procedure A2 at level 38 when it is detected at 38 that the error procedure has already been started. In the case of a positive response, a check is made at 52 that the word pronounced is indeed a repetition of the word which caused the error procedure to be started. If the response to that question is yes, a check is made at 54 as to whether there is in fact a following candidate, that is to say, that the originally displayed candidate is not the last in the list of classified candidates. If the response is negative at 52, operation goes into the error detection routine A4 in the error procedure. If it is detected at 54 that there is a following candidate, the following candidate is displayed at 50.

The adaptive training procedure A3 is entered at the level of the stage 34. If the time elapsed without a word being pronounced is greater than the period of time d1, a check is made in 56 as to whether this is the first period d1 after the error procedure. If the response is positive, a check is made in 58 whether the last word pronounced is in fact a repetition. If the response is again positive, the reference contained in the memory of the word pronounced is replaced in 60 by the coded information corresponding to the word which triggered the error procedure, and the error procedure is stopped in 62. If the response is negative in 56, operation is returned to the input, the error procedure having been previously triggered. If, on the other hand, the response is negative at stage 58, operation goes directly to 62 to interrupt the error procedure and the process is thus reset.

The process A4 for detecting an error in the error procedure is entered at the level of the stage 52. If the word pronounced is not a repetition of the word which triggered of the error procedure, a check is made at 64 whether the next candidate is the third candidate. If the response is positive, a check is made in 66 that it is the second time after an error procedure that there is no repetition. If the response is negative, operation goes back to the input of the apparatus. If the response is positive, the error procedure is interrupted at 62 and the cycle is reset.

It should be noted that the stages 32 and 34 which involve the period of time d1 constitue a preferred embodiment of the means 21 by which the user sets the training procedure in operation, that is to say, replacing a reference by another piece of coded information corresponding to the same word. It should also be noted that, the purpose of the stage 52 is to detect if there is an error in the error procedure or not. In the foregoing description, this detection operation is performed automatically by comparison of the word pronounced with the repeated word which started the error procedure. This comparison may itself be a source of error. It would therefore be possible to replace the stage 52 by a change-over switch actuated by the user who would himself trigger off the error procedure when he found that, for example, he has omitted to repeat a word.

Figure 4:
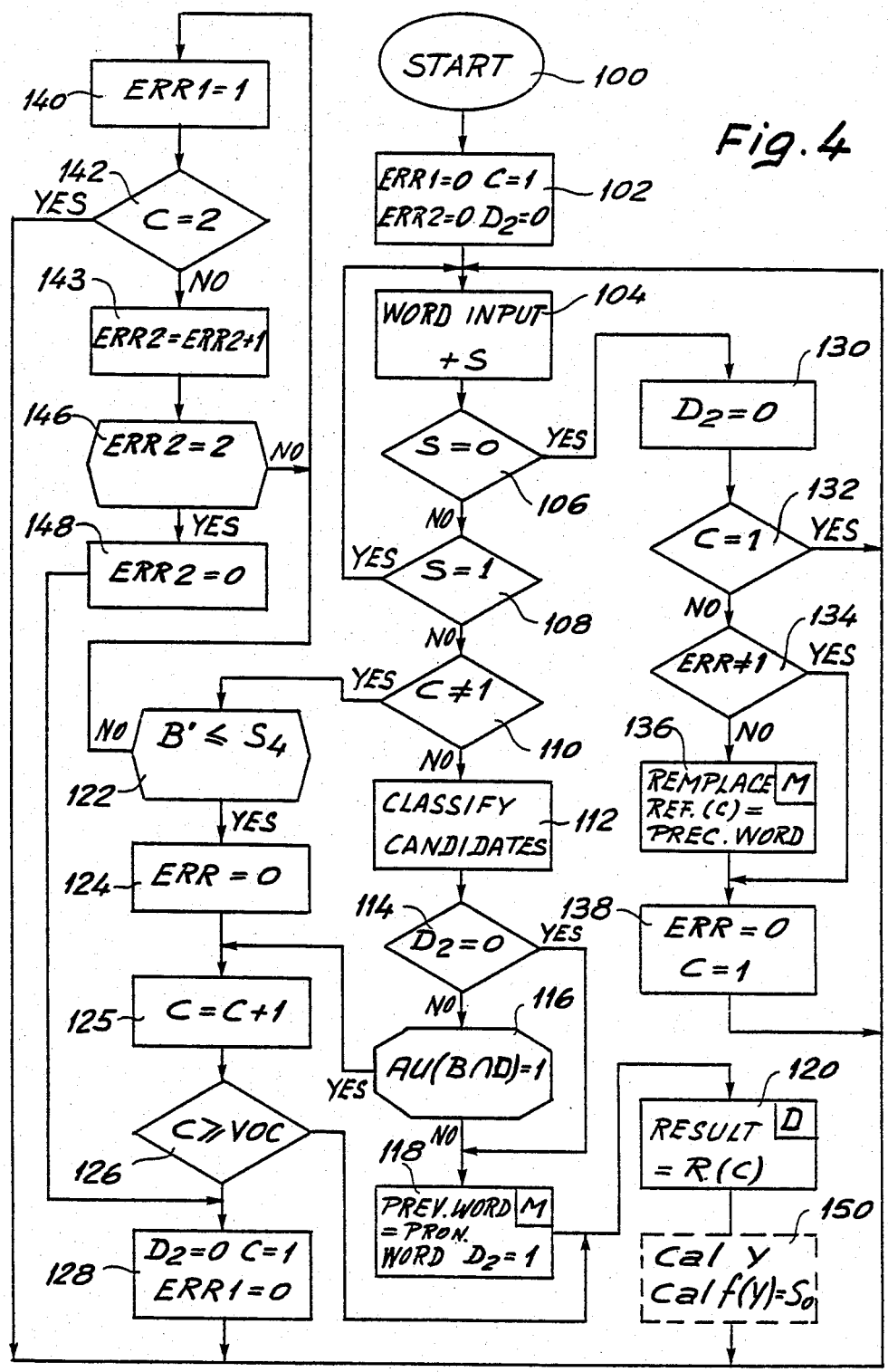
FIG. 4 is a detailed flow chart of the complete mode of operation of the control circuit of the apparatus according to the invention.

The control circuit 6, the mode of operation of which has just been described, is preferably formed by a micro-processor. FIG. 4 shows the detailed algorithm executed by the micro-processor. This algorithm uses a certain number of variables which are explained below. The first variable S is a SUBROUTINE parameter. If there has not been any word pronounced during the period d1, S is zero. If the the word pronounced is not valid, S is one. If the word is valid, S assumes another value.

The variable C is a candidate counter, in the sense explained above. The variable D2 is a delay parameter which can assume values of zero or one. The parameter ERR 1 is a binary parameter defining whether an error procedure has been initiated. The parameter ERR 1 is zero if there is no error procedure, and one in the opposite case. Finally, the parameter ERR 2 is an error parameter in the error procedure.

After the program beginning 100, the program comprises instructions 102 for initializing certain variables. The parameters ERR 1, ERR 2 and D2 are initialized to zero while the candidate counting parameter C is initialized to one. The rectangle 104 diagrammatically represents a word input subroutine. This subroutine comprises, on the one hand, coding the successively pronounced words, and on the other hand, first processing of that coding to verify the validity of the word. In addition, the subroutine includes the equivalent of the delay elements, that is to say, it detects whether the time elapsed between a pronounced word and the previous pronounced word is greater than d1. Finally, this subroutine triggers the beginning of the operation of the apparatus. It is also this subroutine which introduces the coded pronounced word into the memory 8c and which, for each coded word, allocates thereto a value in respect of the variable S, as indicated above. The comparator 106 compares the value of the parameter S to zero. If S is different from zero, the comparator 108 compares S to one. If S is different from one, the comparator 118 compares C to one. If the detector 108 detects that S is one, the program returns to the waiting condition for the introduction of a fresh word. If the comparator 110 detects that C is equal to one, that is to say, that there has not been any error procedure, the subroutine 112 defines the classification of the candidates by means of an algorithm which will be described in detail hereinafter. The comparator 114 then compares the value of the variable D2 to zero. If that value is different from zero, the program 116 detects whether or not there has been repetition, by means of a subroutine which will be described in detail hereinafter. If no repetition has occured, the instruction 118 transfers into the memory of preceding words, at 8d, the word which has just been pronounced and the variable D1 is allocated the value one. The subroutine 120 causes the word corresponding to the value of the candidate counter C to be displayed on the display means 19, that is to say, this program produces as the result, display of the word which is considered as being closest. After the subroutine 120, the program returns to the waiting position for the input of a fresh word. If the detector 110 detected that C is different from one, the subroutine 122 is entered, which compares the pronounced word to the repeated word which caused the error procedure to be begun. If the response to that question is yes, the instruction 124 gives the value zero to the variable ERR 1 and the instruction 125 carries out the operation C=C+1, that is to say, it increments the candidate counter by one unit. The comparator 126 compares the value of C to the total number of words, that is to say references, which are contained in the memory, that number being referred to as VOC. If C is actually higher than VOC, which indicates that an error has occured the instructions 128 reset the parameter D2 to zero, the variable ERR 1 to zero and the candidate counter C to a value of one. The program returns to a waiting state for a fresh word. If, on the other hand, the comparator 126 detected that the level or rank of the candidate was not higher than the total number of references, the subroutine 120 for displaying the candidate selected is entered. In the situation where the comparator 114 detected that D2 was in situation where the comparator 114 detected that D2 was in fact equal to zero, operation goes directly to the instruction 118 because in that case it is certain that there has not been any repetition. If the subprogram 116 has detected that repetition has actually taken place, operation will go directly to the operation 125 which, as already indicated above, increments the candidate counter C by one unit, which corresponds to triggering the error procedure.

If the comparator 106 detects that S is zero, that is to say, that the delay period has been exceeded, the instruction 130 gives the value of zero to the variable D1, since the comparator 132 compares the value of C to one. If C is equal to one, the programm returns to the input waiting for a fresh word, while if C is different from, one that is to say, if an error procedure has taken place, the comparator 134 compares the value of the variable ERR 1 to zero. If that value is equal to zero, the subroutine 136 causes replacement in the memory 8b of the previously stored reference, by the coding of the candidate having the rank of level C. In the following instruction 138, the variable ERR 1 is reset to zero and the variable C is re-initialized to one. The programm returns to the waiting condition for the possible introduction of a fresh word. If the comparator 134 detects that the variable ERR 1 is different from zero, the program goes directly to the instruction 138.

Returning now to the subprogram 122, it will be seen that when, the response is negative, the instruction 140 allocates a value of one to the variable ERR 1. The comparator 142 compares the value of C to two. If C is different from two, the program returns to its waiting condition for the introduction of a fresh word. If the comparison in the comparator 142 is positive, the instruction 143 increments the variable ERR 2 by one unit, performing the operation ERR 2=ERR 2+1. The value of the variable ERR 2 is then compared to two in the comparator 146. If the response is no, the program returns directly to its waiting condition for the introduction of a fresh word. If the response is positive, the instruction 148 re-initializes the variable ERR 2 to zero and the program goes to instruction 128.

It is easy to see that the succession of instructions and subroutine 106 to 120 corresponds to normal operation, that is to say, to the routine $A_1$, that the instructions 122 to 128 correspond to the error procedure, that the instructions and subroutines 130 to 138 correspond to adaptive training and that finally the instruction 140 to 148 correspond to detection of error in the error procedure.

Figure 5A:
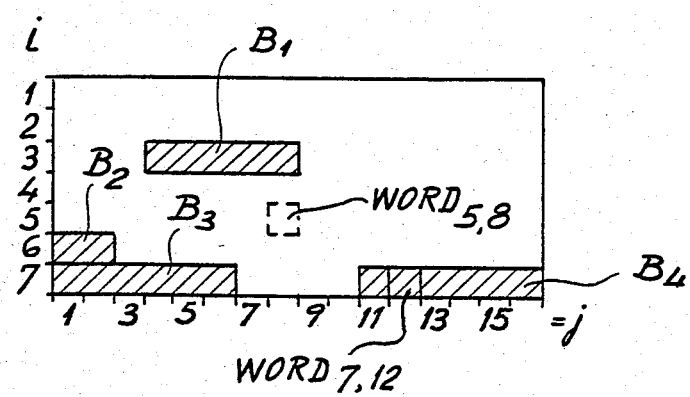
FIGS. 5a and 5b are diagrams illustrating coding of a word and comparison between a word and a memorized reference.

FIG. 5a shows the information coded by a particular coding process associated with a pronounced word. In this coding process, the electrical signal corresponding to the word and supplied by the microphone 2 is filtered simultaneously in seven band pass channels. The electrical signals issuing from the seven filters are converted into binary logic signals by comparison with a threshold. These logic signals are sampled in dependence on their position in the signal and they are processed so that the total length of the information held is standardized. This therefore produces information formed by zeros and ones which are distributed along lines corresponding to the different filtering channels and columns corresponding to the different moments of sampling used. In the particular embodiment illustrated, there are seven channels and sixteen samples. This group of information forms a word. In FIG. 5a, the points of the matrix which are of binary value one, are hatched. It may also be considered that the assembly of points of the matrix of value one is formed by blocks, each block being defined as being a continuous succession of points having a binary value of one and belonging to the same filtering channel. The case shown in FIG. 5a has blocks B1, B2, B3 and B4.

By way of example, the test for validity of a word pronounced, which is performed in stage 36 in FIG. 3, may be as follows.

A word is then defined by the general formula:

$$Word = \{B_1, B_2, \ldots, B_i, \ldots B_M\}$$

in witch each block $B_i$ is defined in the following manner:

$$B_i = \{CHANNEL_i, START_i, STOP_i\}$$

START and STOP constituting the moments of beginning and ending a block. A word will be considered as valid if, for example, it is formed by at least three blocks from three different channels.

The program for verifying this condition from the coded information corresponding to the word is within the capability of those skilled in the art, and there is therefore no need for it to be further defined. This program is carried out in the subroutine indicated at 104 in FIG. 4.

We shall now explain a technique known in itself for measuring the distance between two coded words or between a coded word and a reference for carrying out the candidate classification subroutine 112 or the operations of detecting repetition of the subroutines 116 and 122. The distance between a word and a reference may be defined in the following manner. A word is defined in the following manner:

$$Word = \{word_{i,j}; i=1,2\ldots I, J=1,2\ldots J\}$$

with $Word_{i,j} \in (0.1)$ in which for example, in the case whown in FIG. 5a, the word $Word_{3,13}$ is zero and the word $Word_{7,15}$ is one. In the same manner, the reference memory 8a may be defined as a group of pieces of coded information of reference words, which is defined by:

$$Ref = (Ref^k, k=1,2\ldots n)$$

in which n is the number of references in the memory, that is to say, the number of words in the vocabulary. Each word in the memory is denoted by $Ref^k$ with $$Ref^k = (Ref_{i,j}^k; i=1,2\ldots J)$$

The distance between a coded word "Word" and a reference in the memory, $Ref^k$, is given by the expression:

$$\delta(word, Ref^k) = \frac{\sum_{i=1}^{i=I} \sum_{j=1}^{j=J} (Word_{i,j} \oplus Ref_{i,j}^k)}{\sum_{i=1}^{i=I} \sum_{j=1}^{j=J} (Word_{i,j} + Ref_{i,j}^k)} \quad (1)$$

in which the sign $\oplus$ represents the EXCLUSIVE OR LOGIC function, I represents the number of channels and J represents the number of samples.

Figure 5B:
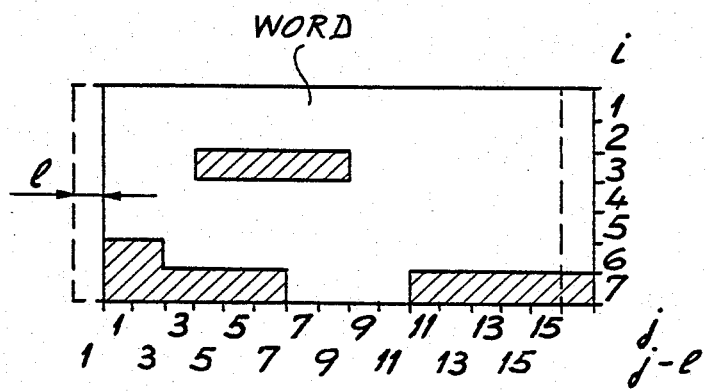
Figure 5B:
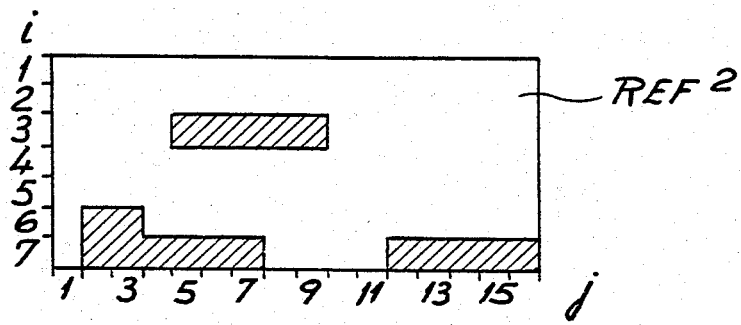

It is clear that this distance may be defined in a specific fashion, in the following manner. The starting point is the table similar to that shown in FIG. 5a, corresponding respectively to the word "Word" and to the reference $Ref^k$, and those two tables are superposed. The numerator in the right-hand term of the equation (1) is equal to the number of points of the two tables which are allocated the binary value one which are not superimposed, while the denominator is equal to the sum of the points in the two tables having the binary value one. FIG. 5b respectively shows a table corresponding to a word and a table corresponding to a reference $Ref^2$. It will be seen immediately that by superimposing those two tables as they are, the points allocated the binary value one which are not superimposed, are numerous. In other words, the distance between these two words is substantial. However, it will be seen that by shifting the contour of the table of the word one step towards the left, without altering the position of the points allocated the binary value of one, the resemblance between the two tables when altered in that fashion is very substantial. It will be readily appreciated that in fact the word and the reference correspond to the same pronounced word and that the apparent difference results largely from a general displacement in detection and coding of the word. In order for measurement of the distance between two words to be truly effective, it is therefore desirable also to envisage possibilities of displacement between the words to be compared or between the word and the reference to be compared. It is this that will be described hereinafter, using l to indicate the displacement which, in the situation shown in FIG. 5b, would be −1.

When the displacement l is introduced, the distance $\delta_l$ between the word "Word" and the reference $Ref^k$ is defined in the following manner:

$$\delta_l(Word, Ref_k) = \frac{\sum_{i=1-l}^{i=I+l} \sum_{j=1}^{j=J} (Word_{i,j-l} \oplus Ref_{i,j}^k)}{\sum_{i=1}^{i=I+l} \sum_{j=1}^{j=J} (Word_{i,j-l} + Ref_{i,j}^k)}$$

-continued with $Word_{i,j-l} = 0$ for $j - l \notin (1, 2 \ldots J)$
and $Ref_{i,j}^k = 0$ for $j \notin (1, 2 \ldots J)$ In order to compare a word and a reference, or two words together, the distances $\delta 1$ are calculated for displacements of $l = +l_1$ to $l = -l_1$ in steps of 1. For example, $l_1 = 2$.

Classification of the candidates may be effected in the following manner: it is noted:

$$\delta_k^* = MIN[\delta l(Word, Ref^k)]$$

The table of the distances T defined by the following is calculates:

$$T = \{\delta_k^*; k = 1, 2, \ldots, n\}$$

To effect classification of the candidates, the elements are sorted, to produce the ordered assembly CDD defined by:

$$CDD = \{CDD_k, k = 1, \ldots, n\}$$

with $CDD_k \in (1, \ldots, n)$
such that $\delta_{CDD_k}^* \leq \delta_{CDD_{k+1}}^*$ The first candidate is therefore the index reference $CDD_1$ and the $i^{th}$ candidate is therefore the index reference $CDD_i$.

Taking this method of calculating the distance between two words, it is possible further to describe the subroutines 116 and 122 in FIG. 4. The subroutine 116 is that which makes it possible to detect whether or not repetition of the pronounced word has occurred, in order to trigger or not trigger the error procedure. In order to ascertain whether of not repetition has taken place, the following conditions are used:

$$\delta_1 \leq S1 <=> A = 1$$

$$\frac{\delta_1 - Best}{\delta_1 + Best} \leq S2 <=> B = 1$$

$$\delta_1 < S3 <=> D = 1$$

The condition for there to be repetition is as follows:

$$A \cup (B\ D) \neq 0.$$

In these expressions, S1, S2 and S3 represent thresholds, $\delta_1$ represents the distance between the word which has just been pronounced and the previous word, and BEST represents the distance between a word which has just been pronounced and the closest reference contained in the memories. S1 is always less than S3. By way of example, the threshold S1 is 0.2, the threshold S2 is $-0.08$ and the threshold S3 is 0.5. It will be seen therefore that this decision algorithm involves either an absolute distance (A) or a double condition relating to an absolute threshold and a relative threshold compared to the smallest distance between the word pronounced and the words contained in the vocabulary. Obviously, $\delta_1$ and BEST are calculated as described hereinbefore, the determine the distance between two words.

The purpose of the subroutine 122 is to determine if the word pronounced is the first word which triggered the error procedure. The algorithm used is as follows:

$$\frac{\delta_2 - BEST}{\delta_2 + BEST} \leq S4$$

in which $\delta_2$ is the distance between the word pronounced and the first word which triggered the error procedure, BEST is identical to the value used in the previously defined algorithm, and S4 represents another threshold which is for example 0.1.

It should be made clear that the conditions A, B and D which are involved in the test 116 each correspond to a particular condition of operation.

The condition $B = 1$ is the normal condition of detecting repetition of a pronounced word. It simply requires that $\delta_1$ is less than BEST, that is to say, the distance between the previously pronounced word must be less than the distance between the word which has just been pronounced an the first candidate. When there is low noise, the two distances $\delta_1$ and BEST both rise and the criterion remains valid. However, when a loud noise is superimposed on the pronounced word. it may be that the condition $B - 1$ is fulfilled although no repetition has occurred. The purpose of the absolute threshold S3 in respect of $\delta_1$ is to eliminate erroneous detection of repetition on the mere sight of the condition $B - 1$.

The third condition $A = 1$ aims to avoid the danger of blocking of the system after an erroneous preliminary training phase which would have resulted in the introduction of a reference corresponding to a word in the memory location corresponding to another word. This could occur with the following sequence.

The user pronounces WATCH and the apparatus displays ALARM. The user then repeats WATCH, which triggers the error procedure, and the word TIMER is displayed. The user again repeats WATCH and the word CHRONO is displayed. The user also allows the delay period d1 to pass. The auto-adaptive training procedure introduces the reference WATCH into the memory location corresponding to the word CHRONO. When the speaker again pronounces the word WATCH, the value of BEST (distance between WATCH pronounced and the WATCH which is in the CHRONO position) can often be less than the value of $\delta_1$ (distance between WATCH pronounced and WATCH pronounced previously). That makes detection of the repetition uncertain whereas in this case it must be certain, in view of the above-described error. It is then the condition $A = 1$ which, being verified, makes it possible to detect the repetition.

Figure 6:
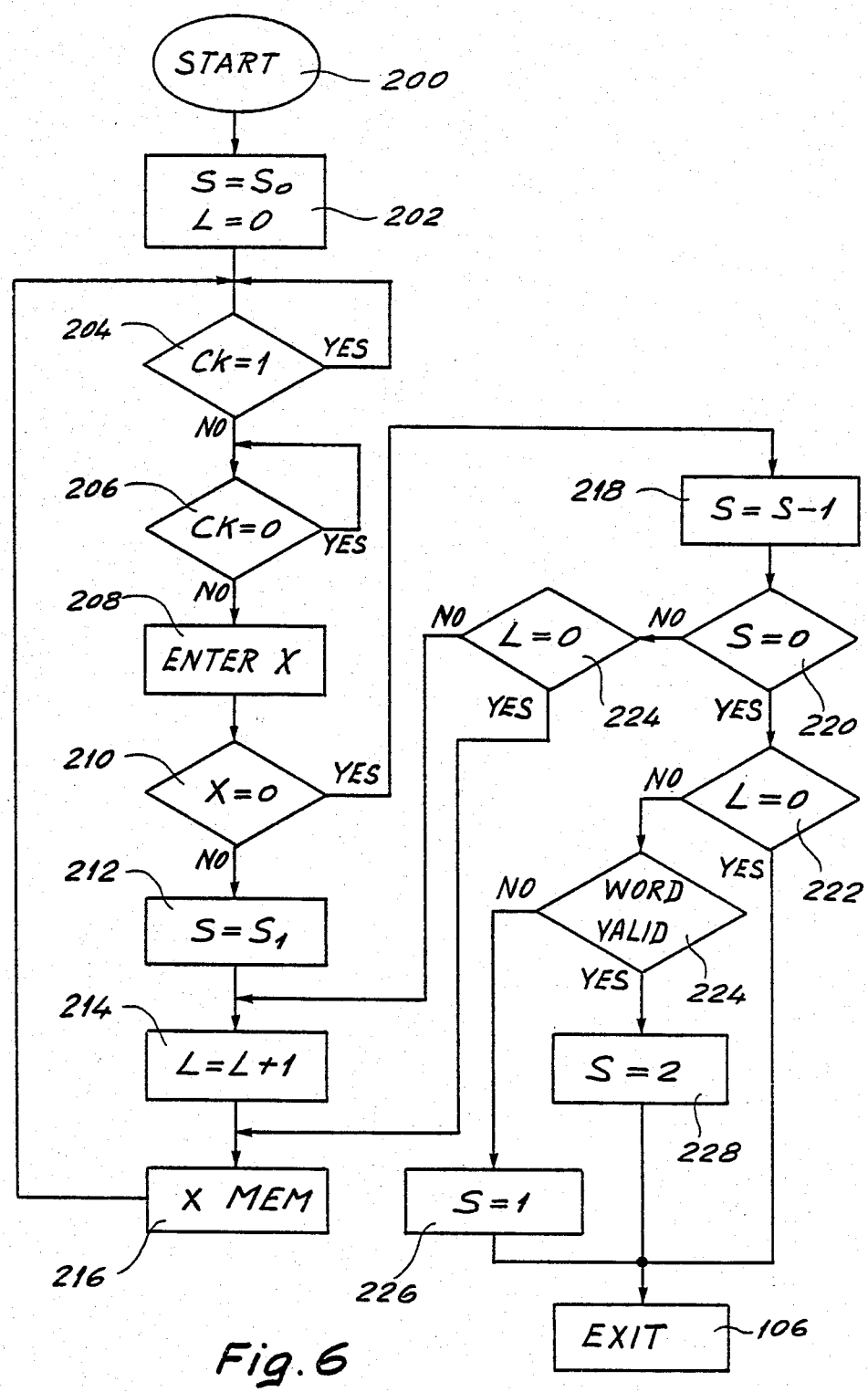
FIG. 6 shows the flow chart of a subprogram of the complete mode of operation illustrated in FIG. 4.

FIG. 6 is an algorithm of the subroutine 104 for the introduction of the coded words. The purpose of this subprogram is substantially to fix the value of the parameter S which may be 0, 1 or 2. This subprogram uses the additional variables L in respect of word length and X which represents a binary seven-bit number forming a sample of the word. This is therefore a column of the matrices shown in FIGS. 5a and 5b.

The program has an entry point 200 while the instructions 202 initialize the parameter S to $S_0$ and the parameter L to zero. The clock of the microprocessor supplies clock pulses CK at a frequency of 100 Hz. $S_0$ corresponds to the delay period d1 in FIG. 3. If therefore the delay period d1 is made equal to five seconds, $S_0$ is 500. The instructions 204 and 206 which compare the clock pulses CK to the logic levels 0 and 1 with their feedback loop are simply intended to synchronize the program with the 100 Hz clock frequency. At 208, the samples X from the filtering circuit are successively introduced at a frequency of 100 Hz. The instruction 210 compares X to zero. The response is positive (X=0) if the seven bits are actually of a value zero. The response is negative, if at least one of the bits is different from zero. If the response is negative, the instruction 212 allocates the value S1 to the parameter S. S1 is for example 20. The instruction 214 then increments the parameter L by one unit and the instruction 216 loads the seven-bit sample X into the memory 8c, in coded or uncoded form. The program returns to the instruction 204 for introduction of the following sample.

If the sample X is equal to zero (instruction 210), the parameter S is decremented by one unit by the instruction 218. The parameter S is compared to zero in 220. If the response is positive (S=0), the parameter L is compared to zero in 222. If the response is positive (L=0), operation goes to the subroutine exit, that is to say, to the instruction 106 in FIG. 4. The parameter S is 0. If the operator 220 produces a negative response (S≠0), the instruction 224 compares the parameter L to zero. If the result of the comparison is positive (L=0), operation goes directly to the instruction 216 which introduces the tested sample into the memory 8c. If the response is negative (L≠0), operation goes to the instruction 214.

If the response to the comparison operation carried out at the instruction 222 is negative (L≠0), operation goes to the instruction 224 which is in fact a word validity detection subroutine. This test has already been described. In this embodiment, an additional condition may be added, namely for example whether the parameter L is greater than or equal to ten. If the word is not valid, the instruction 226 allocates the value 1 to the parameter S and if the word is valid, the instruction 228 allocates the value 2 to the parameter S.

The subprogram mode of operation will be clearly apparent from the foregoing description. As long as no sample is different from zero, the parameter L remains zero and the parameter S is decremented by one unit in each loop. If 500 successive loops are performed, while X constantly remains zero, the parameter S reaches the value zero, with L at a value of zero. This means that no word has been pronounced during the delay period d1 which is equal to 5 seconds. The parameter S is zero. As soon as a sample X which is different from zero appears, the parameter L is 1 and the parameter S is S1, that is to say, 20. This incrementation to S1 means that in this case, if X remains zero during 20 successive loops, the word is considered as terminated since the instruction 218 will have returned the parameter S to zero. In this situation, if the instruction 224 detects that the word formed by the successive samples X is valid, the value 2 is allocated to the parameter S; in the opposite case, it is the value 1 which is allocated to that parameter.

The foregoing description related to the introduction of a single word. This control mode corresponds specifically to the situation where the instructions to be given to the piece of equipment comprise a single word. This is the case when the chronometer function of a watch is to be controlled. It is clear however that certain instructions may comprise a plurality of isolated words. For example, in order to cause an alarm time to be introduced into a watch, the word ALARM and then the words corresponding to the desired hours and minutes of the alarm time must be pronounced in succession. It is therefore necessary for the introduction apparatus to understand that the successive words pronounced are part of the same instruction, while properly separating the words of the instruction. For that purpose, the user must comply with the delay period d1 between the end of the operation of introducing one word of the instruction, and the first sound of the following word. That delay period can be indicated to the user for example by causing a part of the display means to flash, of by using an acoustic warning device. The period d1 is fixed at 5 seconds in the embodiment described.

When the first candidate is much closer to the word pronounced than the second candidate, it is virtually certain that the first candidate is in actual fact the right word. In other words, it is virtually certain that the user will not repeat that word. In that case, it is therefore advantageous for the length of the period d1 to be reduced. For that purpose, Y is calculated, being defined in the following manner:

$$Y = \frac{\delta^*CDD_2 - \delta^*CDD_1}{\delta^*CDD_2 + \delta^*CDD_1}$$

$\delta^*CDD_1$ represents the distance between the word pronounced and the first candidate and $\delta^*CDD_2$ represents the distance between the same word and the second candidate. Y is between 0 and 1. The higher the value of Y, the more certain is recognition of the first candidate. It is therefore possible to reduce d1 as soon as Y is higher than a value a, and the value of d1 can be defined as a decreasing function f of Y. For example, it is possible to select a=0.3 and $d1=d_{max}(1-Y/2)$ with $d_{max}=5$ seconds.

The condition Y≧a with a=0.3 implies that:

$$\delta^*CDD_2 \geq \frac{1.3}{0.7} \delta^*CDD_1$$

The second candidate must therefore be at least substantially twice as "far" from the word pronounced, as the first candidate.

In the algorithm shown in FIG. 6, that means that $S_0$ is variable. In the algorithm in FIG. 4, is is therefore necessary to add a subroutine 150 which calculates Y, which compares Y to a and which calculates:

$$S_o = S_o f(Y) \text{ if } Y \geq a.$$

More generally, the calculation of Y may be replaced by calculation of a function $f_1(\delta^*CDD_1$ and $\delta^*CDD_2)$, which compares the values of $\delta^*CDD_1$ and $\delta^*CDD_2$.

This function must be zero when $\delta^*CDD_1 = \delta^*CDD_2$ and of value 1 when $\delta^*CDD_1 = 0$ and $\delta_{CDD2}=1$.

If $f_1(\delta^*CDD_1, \delta^*CDD_2)$ is higher than a, it is calculated that $d1 = d_{max} f_2(f_1)$. $f_2$ is a decreasing function of $f_1$, at numerical values which are strictly between 0 and 1.

The main attraction of the word introduction apparatus according to the invention will be clearly apparent from the foregoing description. Normal use of the apparatus, that is to say, the introduction of words for controlling the piece of equipment associated with the apparatus and the apprenticeship operation are closely mingled and in fact can be performed simultaneously. In this way, with respect to the initial training method, this arrangement avoids a long and fastidious phase which is strictly reserved for the training operation, and a change of user can be made without having to repeat the whole of the operation of introducing references. In fact, only the words whose pronounciation will have changed will have to be re-memorized. In addition, the training phase concerns only the words which are actually to be used and the apparatus successively indicates to the user the words that have to be re-taught to the word input apparatus.

The tests which have been carried out show that this apparatus provides a much higher degree of flexibility and a greatly improved facility in use when using speech to control the functions of a digital display watch. This result is probably because, when the user repeats the same word several times in succession, the pronounciation of that word scarcely changes and it is therefore easy to detect the repetition. When using the apparatus according to the invention, this repetition not only produces a fresh training operation but also provides for introduction of the word that had been introduced in the factory, the user is required to repeat the word until his own pronounciation of that word is the same as the pronounciation used by the standard of a model speaker who introduced that word into the apparatus in the factory. When the user himself carries out the initial training operation, a certain period of time elapses between the training phase and the actual phase of introducting the word. There is a serious risk that the pronounciation of that word will no longer be the same. There is therefore the danger that it is impossible to introduce the word, and the whole of the training phase will have be repeated.

It is evident that the flexibility of use of the apparatus according to the invention is essentially due to the fact that, at each repetition of a word or more precisely on each occasion that the apparatus has detected a repetition, the display means display the candidate which is the following candidate in order of decreasing resemblance, without any modification in the classification of the candidates. In contrast, in the initial training phase, it is always the first candidate which is displayed. There is therefore no progression in the display of candidates.

It should be noted that ambient noise does not prevent operation of the word introduction apparatus. In the case of noise at a high level, the repetitions of two successive words change in the same manner as the results of the correlation with the references. However, beyond the threshold S3, the apparatus does not detect any repetition and does not go into the error procedure. This prevents any modifications to the references under such poor acoustic conditions, and therefore ensures at the same time that the apparatus has good immunity from noise, without which the system would not operate. It may be said that, in a loud noise environment, the successive repetitions of the same word are not detected as such. The system therefore produces the first candidate as the response, on each occasion. The first candidate changes virtually on each occasion and statistically the user therefore has a good chance of displaying the proper word after a limited number of attempts. In addition, the noise such as the noise of conversation includes moments of silence which permit the system to receive a word without disturbance.

In addition, in the foregoing description, it has been stated that the classification of candidates related to the whole of the n words in the vocabulary serving to control the piece of equipment associated with the word introduction apparatus. It will be apparent however that the vocabulary may be divided up into several groups. In that case, classification of candidates will be effected only among the words in that group, that is to say, among $n_1$ words ($n_1 < n$). *It will be appereciated however that the read only memory 8a contains all the vocabulary.* In that case, the apparatus has a subprogram for defining the words of the group in question. For example, in the case of a watch which has an ALARM function, a CHRONO function and a HOME TIME function, it is clear that, after input of the instruction ALARM, it is the hours and minutes instructions which are to be introduced into the watch, and not the CHRONO or HOME TIME instructions. It will be understood that, by reducing the number of references which have to be considered, it is possible to simplify the coding and to make the comparison algorithms less strict. That permits a reduction in the number of memory locations in the random access memory and the number of binary positions required for coding a word.

Various other modifications of the present invention will be apparent to those skilled in the art, and it therefore is intended that the scope of the present invention be limited solely by the scope of the appended claims.

What is claimed is:

1. A device for introducing control words by speech said words being pronounced by a speaker and belonging to a predetermined vocabulary of n words, said device comprising:

means for coding each word pronounced by the speaker in accordance with a first predetermined algorithm, which gives a coded word;

means for memorizing (a) n coded references each corresponding to the coding of one of the n words of said vocabulary in accordance with the said first algorithm and (b) at least one word pronounced by said speaker in coded form;

means for displaying one of said n words;

means for initiating a change in coded references to provide a different code corresponding to a word; and a control circuit connected to the memorizing means and to the display means, comprising:

(a) repetition detection means for comparing a presently pronounced coded word to the previous coded pronounced word, if it exists, in dependence on a second predetermined algorithm, to detect whether or not the presently pronounced word is a repetition of the previously pronounced word;

(b) means responsive to the detection means for comparing a coded pronounced word when there is no repetition, to the n references, and to allocate to each reference a level of resemblance with the coded pronounced word in dependence on a third predetermined algorithm;

(c) means for causing the display of the memorized reference having a first level of resemblance when no repetition has been detected, and for causing, if repetition has been detected, the display of the word associated with the reference occupying the level of resemblance which immediately follows that of the reference associated with the word displayed immediately previously; and (d) means for replacing in said memorizing means the reference associated with the word displayed last, said reference being replaced by the information corresponding to the coding of the word repeated, said replacement being in response to activation by the speaker of the means for initiating a change of reference, when the speaker has found that the word displayed is the word that he actually pronounced, thereby providing a fresh coded reference for the word.

2. The device of claim 1, wherein said means for controlling a change of references comprises means for timing a delay duration d1 and means for comparing the time elapsing between a pronounced word and the previously pronounced word with the duration d1, the control means being activated when the elapsed time is greater than or equal to d1.

3. The device of claim 1, wherein said comparison means comprises means for measuring the distance between a coded pronounced word and the references; and means for classifying the references in accordance with an increasing order of their distances.

4. The device of claim 3, wherein said means for timing the duration d1 comprises means for producing a function $f_1(\Delta_1, \Delta_2)$ in which $\Delta_2$ represents the distance between a pronounced word and the reference occupying the second level of resemblance, and $\Delta_1$ represents the distance between the pronounced word and the reference occupying the first level of resemblance, the function being zero when $\Delta_1 = \Delta_2$ and being 1 when $\Delta_1 = 0$ and $\Delta_2 = 1$; means for comparing the value of the function $f_1$ with a number a which is strictly between 0 and 1; and means for giving to the duration d1 the value $d_{max}$ when $f_1$ is less than a and the value $d_{max} f_2(f_1)$ in the opposite case, $f_2$ being a decreasing function of $f_1$ at numerical values which are strictly between 0 and 1.

5. The device of claim 3, wherein said repetition detection means comprises:

means for producing the distance $\delta_1$ between a pronounced word and the previously pronounced word;

means for producing the difference $\Delta_1$ between the pronounced word and the reference occupying the first level of resemblance;

means for producing the ratio $$Z = \frac{\delta_1 - \Delta_1}{\delta_1 + \Delta_1}$$

means for comparing the value of Z to a threshold S2, $|S2| > 1$;

means for comparing the value of $\delta_1$ to a first threshold S1 and a seond threshold S3 which are positive and less than 1 with $S1 < S3$; and means for establishing that there is repetition if $\delta_1$ is less that S1 or if at the same time Z is less than S2 and $\delta_1$ is less than S3.

6. A speech recognition device for use with a speech controlled apparatus, said speech recognition device having a predetermined vocabulary of n words, comprising:

code means for transposing each word spoken by a speaker into a coded word;

memory means for containing (a) n codes, each code corresponding to one of the n words of the vocabulary, and (b) the code of at least one word pronounced by a speaker;

display means for displaying one of the n words; and a control circuit connected to the display means and memory means, comprising:

(a) repetition detection means for comparing a code corresponding to the previously pronounced word to the code corresponding to the presently pronounced word to detect whether or not the presently pronounced word has been repeated;

(b) ordering means for comparing the code corresponding to the presently pronounced word, when there is no repetition, to the n codes corresponding to the n words and to allocate to each of the n codes a level of resemblance with the code of the presently pronounced word;

(c) display control means for causing the display of the word corresponding to the code having the first level of resemblance when no repetition of a word has been detected and, if a repetition has been detected, causing the display of the word corresponding to the code having a level of resemblance immediately below that of the code corresponding to the word displayed immediately previously;

(d) alteration means for replacing the code in the memory means associated with the last displayed word, said code being replaced by the code corresponding to the repeated pronounced word, said alteration means being activated by the speaker when the displayed word is the same as the pronounced word, whereby the codes in the memory are adaptively altered during the speech recognition process.

* * * * *